US011946122B2

United States Patent
Gu et al.

(10) Patent No.: US 11,946,122 B2
(45) Date of Patent: Apr. 2, 2024

(54) MICRON SILVER PARTICLE-REINFORCED 316L STAINLESS STEEL MATRIX COMPOSITE AND PREPARATION METHOD THEREOF

(71) Applicant: NANJING UNIVERSITY OF AERONAUTICS AND ASTRONAUTICS, Nanjing (CN)

(72) Inventors: Dongdong Gu, Nanjing (CN); Kaijie Lin, Nanjing (CN); Jingfeng Quan, Nanjing (CN); Yamei Fang, Nanjing (CN); Qing Ge, Nanjing (CN); Jie Zhuang, Nanjing (CN); Yang Liu, Nanjing (CN); Weisong Dong, Nanjing (CN); Pengjiang Shuai, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 519 days.

(21) Appl. No.: 17/263,876

(22) PCT Filed: Jul. 23, 2020

(86) PCT No.: PCT/CN2020/103772
§ 371 (c)(1),
(2) Date: Jan. 27, 2021

(87) PCT Pub. No.: WO2021/174750
PCT Pub. Date: Sep. 10, 2021

(65) Prior Publication Data
US 2022/0112584 A1  Apr. 14, 2022

(30) Foreign Application Priority Data

Mar. 6, 2020  (CN) .................... 2020 10153865.7

(51) Int. Cl.
*C22C 38/00* (2006.01)
*B22F 1/05* (2022.01)
(Continued)

(52) U.S. Cl.
CPC .............. *C22C 38/007* (2013.01); *B22F 9/04* (2013.01); *B22F 10/28* (2021.01); *B22F 10/36* (2021.01);
(Continued)

(58) Field of Classification Search
CPC ..................................................... B33Y 10/00
See application file for complete search history.

(56) References Cited

U.S. PATENT DOCUMENTS

| 2004/0081573 A1 | 4/2004 | Newell |
| 2021/0138587 A1* | 5/2021 | Shima ................ B23K 26/1464 |

FOREIGN PATENT DOCUMENTS

| CN | 1576381 A | 2/2005 |
| CN | 107245659 A | 10/2010 |

(Continued)

OTHER PUBLICATIONS

ASM (Cverna, Fran, ed. ASM Ready Reference: Thermal properties of metals. ASM International, 2002. (Year: 2002).*
(Continued)

*Primary Examiner* — Sally A Merkling
*Assistant Examiner* — Sean P. O'Keefe
(74) *Attorney, Agent, or Firm* — Cowan, Liebowitz & Latman, P.C.; Mark Montague

(57) ABSTRACT

The present disclosure relates to a micron silver particle-reinforced 316L stainless steel matrix composite, including a 316L stainless steel matrix and silver particles uniformly distributed in the 316L stainless steel matrix. The silver particles have a weight 1% to 5% of the total weight of the composite; and the composite has a density of 7.9 g/cm³ to
(Continued)

8.2 g/cm³ and a relative density of more than 98%. The composite is prepared by the following method: mixing raw materials of a spherical silver powder and a spherical 316L stainless steel powder; subjecting a resulting mixture to mechanical ball milling to obtain a mixed powder; sieving the mixed powder and adding a resulting powder to a powder cylinder of an SLM forming machine; and charging an inert protective gas for printing to obtain the composite.

8 Claims, 3 Drawing Sheets

(51) Int. Cl.
| | |
|---|---|
| *B22F 1/065* | (2022.01) |
| *B22F 9/04* | (2006.01) |
| *B22F 10/28* | (2021.01) |
| *B22F 10/322* | (2021.01) |
| *B22F 10/36* | (2021.01) |
| *B22F 10/366* | (2021.01) |
| *B23K 26/00* | (2014.01) |
| *B23K 26/342* | (2014.01) |
| *B33Y 10/00* | (2015.01) |
| *B33Y 70/00* | (2020.01) |
| *B23K 103/04* | (2006.01) |

(52) U.S. Cl.
CPC ........ *B22F 10/366* (2021.01); *B23K 26/0006* (2013.01); *B23K 26/342* (2015.10); *B33Y 70/00* (2014.12); *B22F 1/05* (2022.01); *B22F 1/065* (2022.01); *B22F 2009/043* (2013.01); *B22F 10/322* (2021.01); *B22F 2301/255* (2013.01); *B22F 2301/35* (2013.01); *B22F 2304/10* (2013.01); *B23K 2103/05* (2018.08); *B33Y 10/00* (2014.12)

(56) References Cited

FOREIGN PATENT DOCUMENTS

| | | |
|---|---|---|
| CN | 107012381 A | 8/2017 |
| CN | 107760946 A | 3/2018 |
| CN | 111230115 A | 6/2020 |
| IN | 110355367 A | 10/2019 |
| JP | 10259456 A * | 9/1998 |
| WO | 2019105563 A1 | 6/2019 |

OTHER PUBLICATIONS

CN110355367A English language translation (Year: 2019).*
Jingfeng Quan; Selective laser melting of silver submicron powder modified 316L stainless steel: Influence of silver addition on Microstructures and performances, Powder Technology 30.1, Jan. 30, 2020, pp. 478-483.
International Search Report to PCT/CN2020/103772; dated Nov. 12, 2020, 5 pages.

* cited by examiner

MICRON SILVER PARTICLE-REINFORCED 316L STAINLESS STEEL MATRIX COMPOSITE AND PREPARATION METHOD THEREOF

The present application claims priority to the Chinese Patent Application No. 202010153865.7, filed to the China National Intellectual Property Administration (CNIPA) on Mar. 6, 2020 and entitled "MICRON SILVER PARTICLE-REINFORCED 316L STAINLESS STEEL MATRIX COMPOSITE AND PREPARATION METHOD THEREOF", which is incorporated herein by reference in its entirety.

TECHNICAL FIELD

The present disclosure relates to a micron silver particle-reinforced 316L stainless steel matrix composite and a preparation method thereof, and belongs to the technical field of material preparation.

BACKGROUND 316L stainless steel is widely used in food processing, medical equipment, fuel-cell bipolar plates, or the like due to its prominent corrosion-resistance, workability, low cost, and other advantages. However, the bipolar plate of a proton exchange membrane fuel cell (PEMFC) requires high corrosion-resistance and electrical conductivity, and the 316L stainless steel alone cannot meet the requirements. This defect can be overcome by introducing particles capable of reinforcing the corrosion-resistance and electrical conductivity into the 316L stainless steel to form a particle-reinforced stainless steel matrix composite.

Particle-reinforced stainless steel matrix composites have attracted widespread attention because the composites require an inexpensive reinforcement phase, have uniform microstructures and isotropic material properties, and can be processed by traditional metal processing techniques. Previous studies on a process of manufacturing a particle-reinforced stainless steel matrix composite often focus on the traditional composite method of adding reinforcements, but many problems have been found in the traditional composite technologies, such as poor bonding between a reinforcement and a matrix, easy segregation of a reinforcement, complicated process, high cost, and the like. Compared with a traditional composite technology, the selective laser melting (SLM) technology has attracted people's attention due to its advantages of high melting-concreting speed, tiny formed material structures, uniform reinforcement phase distribution, and the like, which can save time and materials and realize the integral forming of a complex structure. Compared with the traditional surface modification treatment for a material, the alloying modification treatment on a material through the SLM technology can simplify the process, reduce the cost, and extend the service life of the material.

The inventor adopts silver particles as a reinforcement phase, which are uniformly distributed in a 316L stainless steel matrix at an optimized amount through the SLM technology to obtain a composite with excellent electrical conductivity and corrosion-resistance. The present disclosure is of great significance for expanding the application of 316L stainless steel in fuel-cell bipolar plates and other fields (those with high requirements for corrosion-resistance and electrical conductivity).

SUMMARY

The present disclosure is intended to overcome the aforementioned shortcomings in the prior art and provide a micron silver particle-reinforced 316L stainless steel matrix composite and a preparation method thereof.

The present disclosure provides a micron silver particle-reinforced 316L stainless steel matrix composite, including a 316L stainless steel matrix and silver particles uniformly distributed in the 316L stainless steel matrix. The silver particles have a weight 1% to 5% of the total weight of the micron silver particle-reinforced 316L stainless steel matrix composite; and the micron silver particle-reinforced 316L stainless steel matrix composite has a density of 7.9 $g/cm^3$ to 8.2 $g/cm^3$ and a relative density of more than 98%.

The present disclosure introduces micron silver particles as alloying elements into the 316L stainless steel matrix to improve the corrosion-resistance and electrical conductivity of the 316L stainless steel.

The present disclosure provides a preparation method of the micron silver particle-reinforced 316L stainless steel matrix composite described in the above solution, including the following steps:

(1) mixing raw materials of a spherical silver powder and a spherical 316L stainless steel powder and subjecting a resulting mixture to mechanical ball milling to obtain a mixed powder, where, the spherical silver powder has a mass fraction of 1% to 5% in the mixed powder; and (2) sieving the mixed powder, adding a resulting powder to a powder cylinder of an SLM forming machine, and charging an inert protective gas for printing to obtain the micron silver particle-reinforced 316L stainless steel matrix composite.

Further, in step (1), the spherical silver powder may have a purity of 99.99% and a particle size of 1 μm to 5 μm.

Further, in step (1), the spherical 316L stainless steel powder may have a particle size of 30 μm to 60 μm.

Further, in step (1), the mechanical ball milling may adopt zirconia as milling balls; a total mass of the spherical silver powder and the spherical 316L stainless steel powder may have a ratio of 1:1 with a mass of the milling balls; and the ball milling may be conducted for 4 h to 6 h.

Further, in step (2), the sieving may be conducted with a 200-mesh sieve.

Further, in step (2), printing parameters of the SLM forming machine may be as follows: laser power: 300 W to 325 W; scanning speed: 1,500 mm/s to 2,000 mm/s; layer thickness: 30 μm; scanning pitch: 50 μm; island-shaped scanning; starting angle: 0°; and rotation angle: 90°.

Beneficial effects of the present disclosure: The present disclosure uses the SLM technology to make the silver particles uniformly distributed in the 316L stainless steel matrix, with a simple process, reduced time, and low cost. A prepared composite has excellent electrical conductivity and corrosion-resistance. The present disclosure is of great significance for expanding the application of 316L stainless steel in fuel-cell bipolar plates and other fields (those with high requirements for corrosion-resistance and electrical conductivity).

DETAILED DESCRIPTION

The technical solutions of the present disclosure will be further described below with reference to the accompanying drawings and specific examples.

In the following examples, the spherical silver powder was purchased from Shanghai Chaowei Nano Technology, with a purity of 99.99%; the spherical 316L stainless steel powder was purchased from Powder Alloy corporation; and the SLM forming machine was an SLM forming machine of the Nanjing University of Aeronautics and Astronautics (NUAA), with the maximum power of 500 W and a spot diameter of 70 μm. However, they are not limited thereto.

Example 1

A preparation method of micron silver particle-reinforced 316L stainless steel matrix composite included the following steps:

(1) A spherical silver powder (with a particle size of 4 μm) and a spherical 316L stainless steel powder (with a particle size of 40 μm) were adopted as raw materials, which were mixed and subjected to mechanical ball milling (zirconia was used as milling balls, a total mass of the spherical silver powder and the spherical 316L stainless steel powder had a ratio of 1:1 with a mass of the milling balls, and the ball milling was conducted for 5 h) to obtain a mixed powder. The spherical silver powder had a mass fraction of 5% in the mixed powder.

(2) The mixed powder was sieved and added to a powder cylinder of the SLM forming machine, and an inert protective gas was charged for printing (printing parameters of the SLM forming machine: laser power: 325 W; scanning speed: 2,000 mm/s; layer thickness: 30 μm; scanning pitch: 50 μm; island-shaped scanning; starting angle: 0°; and rotation angle: 90°) to obtain the micron silver particle-reinforced 316L stainless steel matrix composite. As measured, the composite had a density of 7.94 g/cm$^3$ and a relative density of 98.34%.

Figure 1:
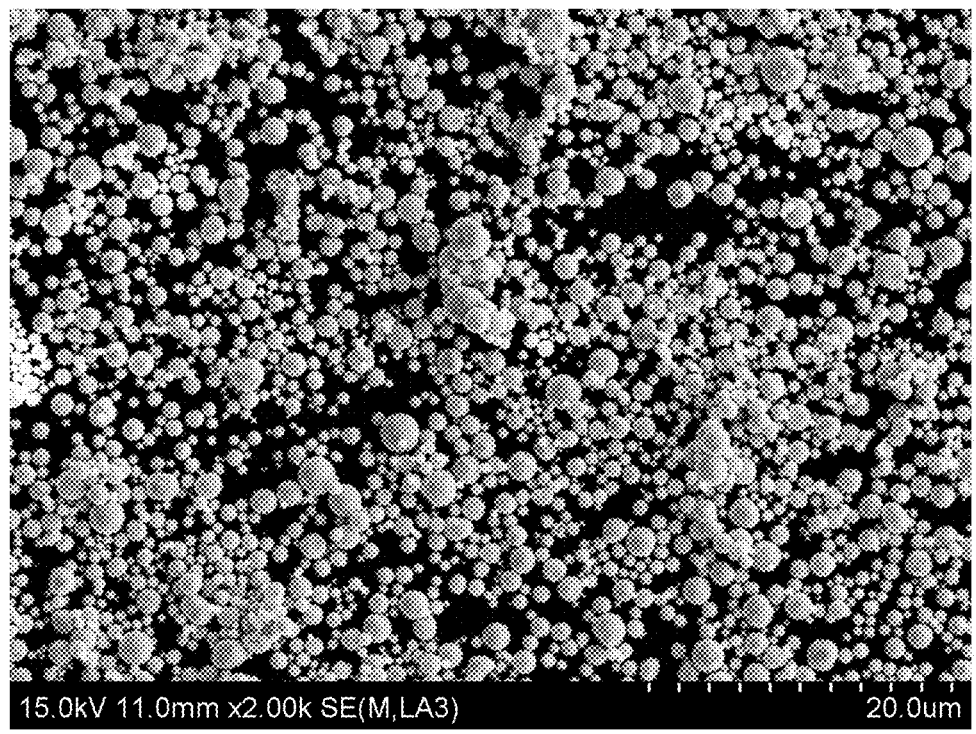
FIG. 1 is a scanning electron microscopy (SEM) image of the spherical silver powder in Example 1.
Figure 2:
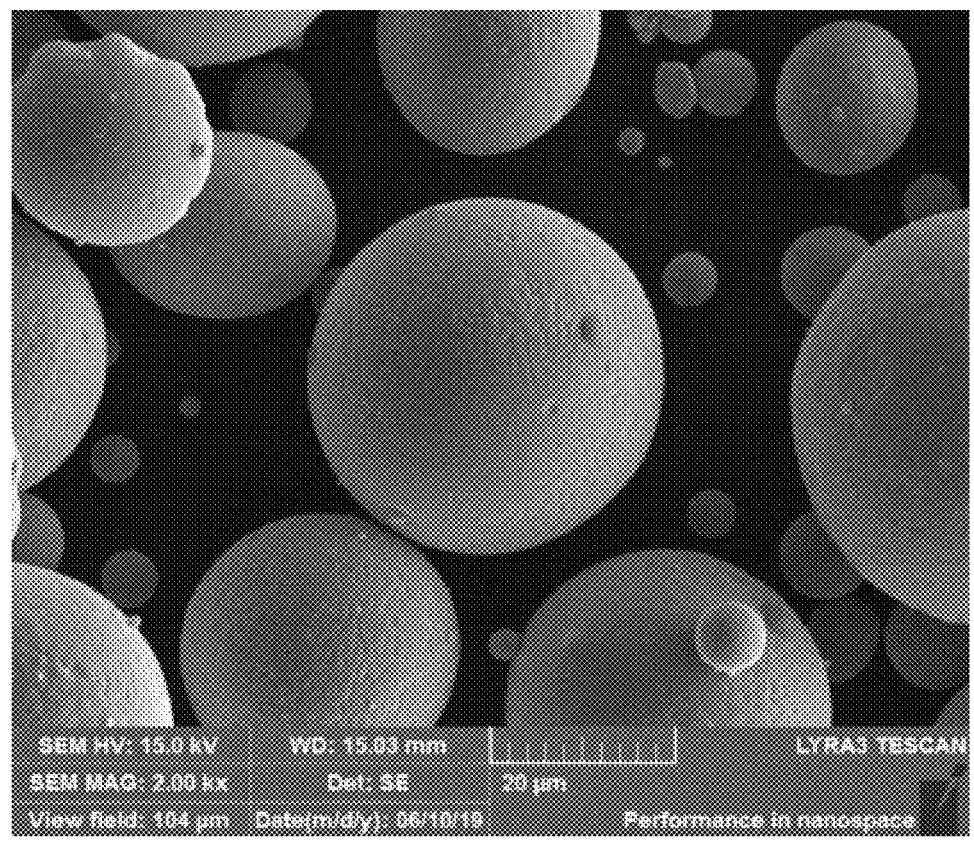
FIG. 2 is an SEM image of the spherical 316L stainless steel powder in Example 1.
Figure 3:
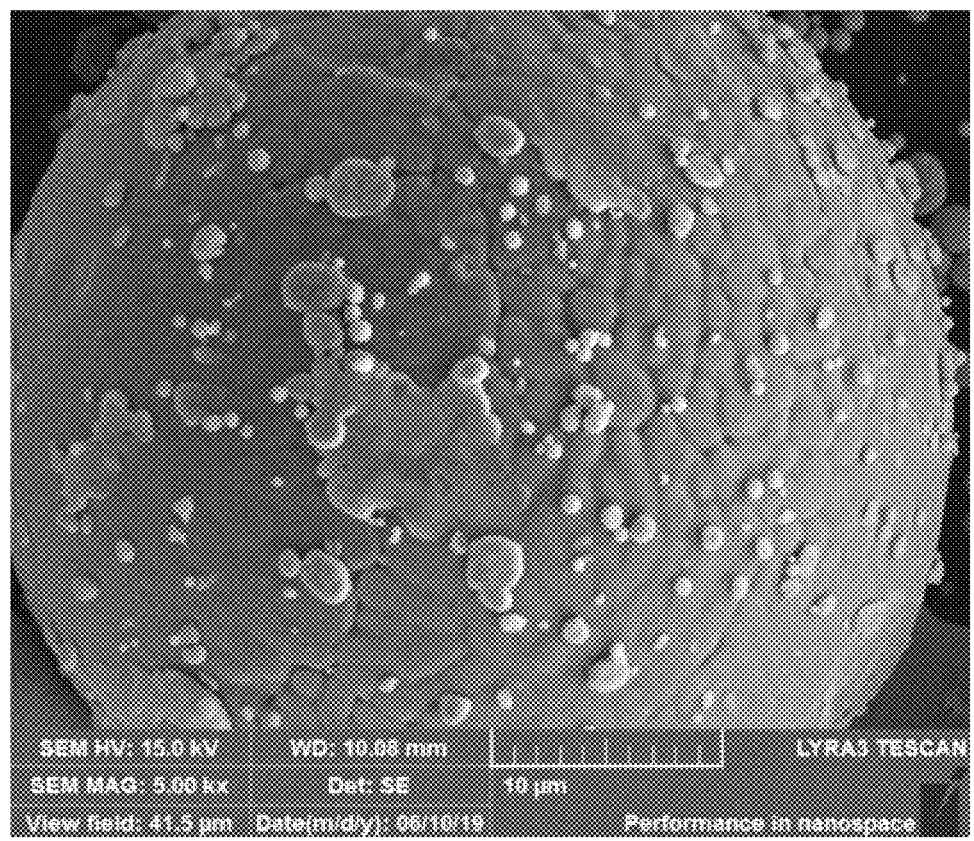
FIG. 3 is an SEM image of the mixed powder in Example 1.
Figure 4:
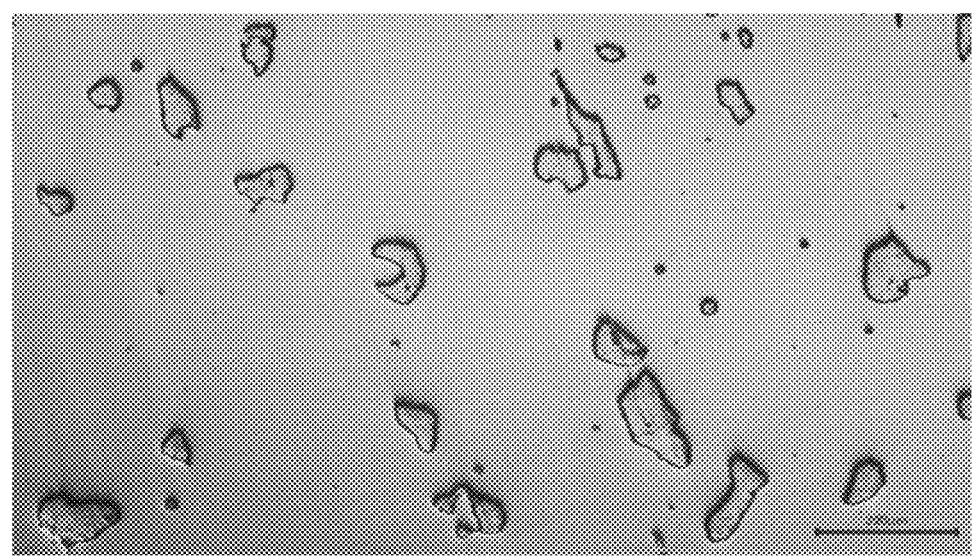
FIG. 4 is an optical microscopy (OM) image of the micron silver particle-reinforced 316L stainless steel matrix composite formed in Example 1.
Figure 5:
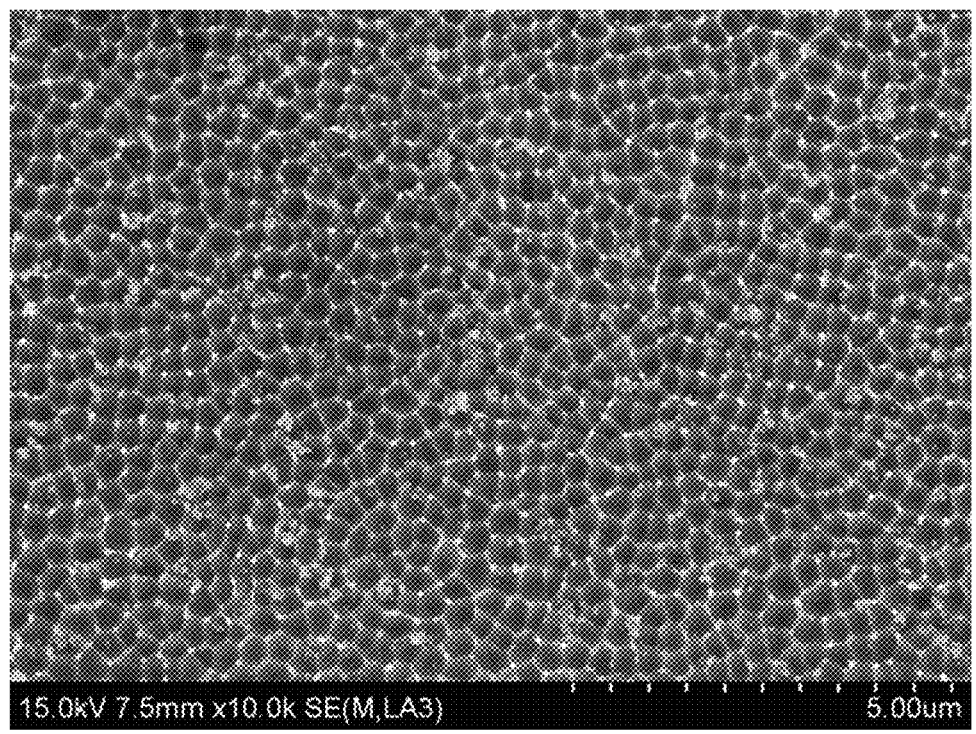
FIG. 5 is an SEM image of the micron silver particle-reinforced 316L stainless steel matrix composite formed in Example 1.

An SEM image of the spherical silver powder in Example 1 is shown in FIG. 1; an SEM image of the spherical 316L stainless steel powder is shown in FIG. 2; an SEM image of the mixed powder is shown in FIG. 3; and an OM image and an SEM image of the formed micron silver particle-reinforced 316L stainless steel matrix composite are shown in FIG. 4 and FIG. 5, respectively. It can be seen from FIG. 1 to FIG. 5 that the original silver powder and 316L stainless steel powder have high sphericity. After the ball milling, the silver powder and 316L stainless steel powder were thoroughly mixed, and part of the silver powder was extruded into flakes and attached to the surface of the 316L stainless steel powder. There were both micro-scale and nano-scale silver particles in the formed micron silver particle-reinforced 316L stainless steel matrix composite. The micro-scale silver particles were uniformly distributed in the 316L stainless steel matrix, while the nano-scale silver particles were prone to be distributed along the grain boundary of 316L stainless steel sub-grains.

Example 2

A preparation method of micron silver particle-reinforced 316L stainless steel matrix composite included the following steps:

(1) A spherical silver powder (with a particle size of 4 μm) and a spherical 316L stainless steel powder (with a particle size of 60 μm) were adopted as raw materials, which were mixed and subjected to mechanical ball milling (zirconia was used as milling balls, a total mass of the spherical silver powder and the spherical 316L stainless steel powder had a ratio of 1:1 with a mass of the milling balls, and the ball milling was conducted for 6 h) to obtain a mixed powder. The spherical silver powder had a mass fraction of 5% in the mixed powder.

(2) The mixed powder was sieved and added to a powder cylinder of the SLM forming machine, and an inert protective gas was charged for printing (printing parameters of the SLM forming machine: laser power: 325 W; scanning speed: 1500 mm/s; layer thickness: 30 μm; scanning pitch: 50 μm; island-shaped scanning; starting angle: 0°; and rotation angle: 90°) to obtain the micron silver particle-reinforced 316L stainless steel matrix composite.

As measured, the composite had a density of 7.91 g/cm$^3$ and a relative density of 98%.

Example 3

A preparation method of micron silver particle-reinforced 316L stainless steel matrix composite included the following steps:

(1) A spherical silver powder (with a particle size of 4 μm) and a spherical 316L stainless steel powder (with a particle size of 30 μm) were adopted as raw materials, which were mixed and subjected to mechanical ball milling (zirconia was used as milling balls, a total mass of the spherical silver powder and the spherical 316L stainless steel powder had a ratio of 1:1 with a mass of the milling balls, and the ball milling was conducted for 4 h) to obtain a mixed powder. The spherical silver powder had a mass fraction of 5% in the mixed powder.

(2) The mixed powder was sieved and added to a powder cylinder of the SLM forming machine, and an inert protective gas was charged for printing (printing parameters of the SLM forming machine: laser power: 300 W; scanning speed: 1500 mm/s; layer thickness: 30 μm; scanning pitch: 50 μm; island-shaped scanning; starting angle: 0°; and rotation angle: 90°) to obtain the micron silver particle-reinforced 316L stainless steel matrix composite.

As measured, the composite had a density of 7.98 g/cm$^3$ and a relative density of 98.87%.

The corrosion-resistance and electrical conductivity tests were conducted for the micron silver particle-reinforced 316L stainless steel matrix composites formed in Examples 1 to 3, and test results were compared with that of the 316L stainless steel:

1. Corrosion-Resistance Test

Test method: A traditional three-electrode system (with a platinum electrode as a counter electrode and a saturated calomel electrode (SCE) as a reference electrode) was adopted. The potentiodynamic polarization curve was plotted for a test sample on the Chenhua electrochemical workstation chi760e to analyze the corrosion-resistance of the sample. The surface of a sample was polished into a mirror surface, and finally the sample was immersed in an electrolyte (0.5 mol/L H$_2$SO$_4$+2 ppm HF) for test. Test conditions: starting potential=−0.6 V, ending potential=1.2 V, and scanning speed=0.001 V/s.

Test results are shown in Table 1.

TABLE 1

Corrosion-resistance test results

| | Example 1 | Example 2 | Example 3 | 316 L stainless steel |
|---|---|---|---|---|
| Corrosion current density (μA/cm$^2$) | 35.01 | 36.14 | 34.89 | 47.01 |

2. Electrical Conductivity Test

Test method: The method and steps described in the following reference were used to test the surface contact resistance: Wang H, Sweikart M A, Turner J A. Stainless steel as bipolar plate material for polymer electrolyte membrane fuel cells. 2003; 115: 243-251. doi: 10.1016/S0378-7753(03)00023-5. Test parameters: loading pressure=1.4 MPa and loading speed=1 N/s. Test results are shown in Table 2.

TABLE 2

Electrical conductivity test results

| | Example 1 | Example 2 | Example 3 | 316 L stainless steel |
|---|---|---|---|---|
| Surface contact resistance (mΩ · cm$^2$) | 90.05 | 91.15 | 85.35 | 191.65 |

It can be seen from the test results in Table 1 and Table 2 that the micron silver particle-reinforced 316L stainless steel matrix composite in the present disclosure has excellent electrical conductivity and corrosion-resistance.

What is claimed is:

1. A preparation method of a micron silver particle-reinforced 316L stainless steel matrix composite, comprising the following steps:
   (1) mixing raw materials of a spherical silver powder and a spherical 316L stainless steel powder and subjecting a resulting mixture to mechanical ball milling to obtain a mixed powder, wherein, the spherical silver powder has a mass fraction of % to 5% in the mixed powder; and
   (2) sieving the mixed powder, adding a resulting powder to a powder cylinder of an SLM forming machine, and printing the resulting powder under a condition of charging an inert protective gas, to obtain the micron silver particle-reinforced 316L stainless steel matrix composite;
   wherein the micron silver particle-reinforced 316L stainless steel matrix composite comprises a 316L stainless steel matrix and silver particles uniformly distributed in the 316L stainless steel matrix, wherein, the silver particles have a weight 1% to 5% of the total weight of the micron silver particle-reinforced 316L stainless steel matrix composite; and the micron silver particle-reinforced 316L stainless steel matrix composite has a density of 7.9 g/cm$^3$ to 8.2 g/cm$^3$ and a relative density of more than 98%; and
   in step (1), milling balls used in the mechanical ball milling are made of zirconia, a ratio of a total mass of the spherical silver powder and the spherical 316L stainless steel powder to a mass of the milling balls is 1:1, and the ball milling is conducted for 4 h to 6 h.

2. The preparation method of the micron silver particle-reinforced 316L stainless steel matrix composite according to claim 1, wherein, in step (1), the spherical silver powder has a purity of 99.99% and a particle size of 1 μm to 5 μm.

3. The preparation method of the micron silver particle-reinforced 316L stainless steel matrix composite according to claim 2, wherein, in step (2), printing parameters of the SLM forming machine are as follows: laser power: 300 W to 350 W; scanning speed: 2,000 mm/s; layer thickness: 30 μm; scanning pitch: 50 μm; island-shaped scanning; starting angle: 0°; and rotation angle: 90°.

4. The preparation method of the micron silver particle-reinforced 316L stainless steel matrix composite according to claim 1, wherein, in step (1), the spherical 316L stainless steel powder has a particle size of 30 μm to 60 μm.

5. The preparation method of the micron silver particle-reinforced 316L stainless steel matrix composite according to claim 4, wherein, in step (2), printing parameters of the SLM forming machine are as follows: laser power: 300 W to 350 W; scanning speed: 2,000 mm/s; layer thickness: 30 μm; scanning pitch: 50 μm; island-shaped scanning; starting angle: 0°; and rotation angle: 90°.

6. The preparation method of the micron silver particle-reinforced 316L stainless steel matrix composite according to claim 1, wherein, in step (2), the sieving is conducted with a 200-mesh sieve.

7. The preparation method of the micron silver particle-reinforced 316L stainless steel matrix composite according to claim 6, wherein, in step (2), printing parameters of the SLM forming machine are as follows: laser power: 300 W to 350 W; scanning speed: 2,000 mm/s; layer thickness: 30 μm; scanning pitch: 50 μm; island-shaped scanning; starting angle: 0°; and rotation angle: 90°.

8. The preparation method of the micron silver particle-reinforced 316L stainless steel matrix composite according to claim 1, wherein, in step (2), printing parameters of the SLM forming machine are as follows: laser power: 300 W to 350 W; scanning speed: 2,000 mm/s; layer thickness: 30 μm; scanning pitch: 50 μm; island-shaped scanning; starting angle: 0°; and rotation angle: 90°.

* * * * *